(12) United States Patent
Young

(10) Patent No.: US 7,765,557 B2
(45) Date of Patent: *Jul. 27, 2010

(54) SYSTEM AND METHOD FOR ANALYZING BUSINESS EVENTS

(75) Inventor: Alan Young, Mount Sinai, NY (US)

(73) Assignee: Computer Associates Think, Inc., Islandia, NY (US)

( * ) Notice: Subject to any disclaimer, the term of this patent is extended or adjusted under 35 U.S.C. 154(b) by 601 days.

This patent is subject to a terminal disclaimer.

(21) Appl. No.: 10/189,838

(22) Filed: Jul. 5, 2002

(65) Prior Publication Data

US 2003/0115078 A1 Jun. 19, 2003

Related U.S. Application Data

(60) Provisional application No. 60/303,595, filed on Jul. 5, 2001.

(51) Int. Cl.
G06F 9/44 (2006.01)
G06F 15/18 (2006.01)
G06F 17/00 (2006.01)
G06Q 40/00 (2006.01)

(52) U.S. Cl. .......................... 719/318; 705/38; 705/39; 706/21; 706/47

(58) Field of Classification Search .................. 719/318; 705/1–11, 26, 27, 35, 38–43; 709/201–250; 706/15–61, 6; 707/1–10; 713/194
See application file for complete search history.

(56) References Cited

U.S. PATENT DOCUMENTS

| | | | |
|---|---|---|---|
| 4,563,746 A | 1/1986 | Yoshida et al. | 364/492 |
| 4,642,782 A | 2/1987 | Kemper et al. | 364/550 |
| 4,754,410 A | 6/1988 | Leech et al. | 364/513 |
| 5,052,043 A | 9/1991 | Gaborski | 382/14 |
| 5,142,612 A | 8/1992 | Skeirik | 395/11 |
| 5,197,114 A | 3/1993 | Skeirik | 395/22 |
| 5,311,421 A | 5/1994 | Nomura et al. | 364/157 |
| 5,321,837 A | 6/1994 | Daniel et al. | 395/650 |
| 5,402,521 A | 3/1995 | Niida et al. | 395/22 |
| 5,440,723 A | 8/1995 | Arnold et al. | 395/181 |
| 5,446,653 A | 8/1995 | Miller et al. | 364/401 |
| 5,487,148 A | 1/1996 | Komori et al. | 395/182 |
| 5,521,813 A | 5/1996 | Fox et al. | |

(Continued)

OTHER PUBLICATIONS

European Patent Office, Communication, "Supplemental European Search Report," Application No. EP 02 76 5800, Reference No. HCD/j00046184EP, Mailed Aug. 10, 2004, 3 pages.

(Continued)

Primary Examiner—Hyung S Sough
Assistant Examiner—Charles E Anya
(74) Attorney, Agent, or Firm—Baker Botts L.L.P.

(57) ABSTRACT

A system for analyzing business events is provided. The system includes a reactive event processing module, a proactive event processing module and a predictive event processing module. The reactive, proactive and predictive processing modules are each operative to receive and initiate an process associated with a respective type of business event. The system further includes an event delivery module. The event delivery module is operative to deliver the business events to the reactive event processing module, the proactive event processing module and the predictive event processing module.

37 Claims, 6 Drawing Sheets

U.S. PATENT DOCUMENTS

| | | | |
|---|---|---|---|
| 5,557,547 A | 9/1996 | Phaal | 364/551 |
| 5,627,886 A | 5/1997 | Bowman | |
| 5,659,667 A | 8/1997 | Buescher et al. | 395/23 |
| 5,729,472 A | 3/1998 | Seiffert et al. | 364/550 |
| 5,832,467 A | 11/1998 | Wavish | 706/13 |
| 5,839,117 A | 11/1998 | Cameron et al. | 705/27 |
| 5,873,084 A | 2/1999 | Bracho et al. | 707/10 |
| 5,889,993 A | 3/1999 | Kroeger et al. | 395/704 |
| 6,067,525 A * | 5/2000 | Johnson et al. | 705/10 |
| 6,092,102 A | 7/2000 | Wagner | |
| 6,108,700 A | 8/2000 | Maccabee et al. | 709/224 |
| 6,131,118 A | 10/2000 | Stupek et al. | |
| 6,167,448 A | 12/2000 | Hemphill et al. | |
| 6,195,662 B1 | 2/2001 | Ellis et al. | 707/103 |
| 6,199,047 B1 | 3/2001 | Dimino et al. | 705/10 |
| 6,327,550 B1 | 12/2001 | Vinberg et al. | 702/186 |
| 6,546,378 B1 | 4/2003 | Cook | 706/12 |
| 6,732,082 B1 * | 5/2004 | Gavan et al. | 706/10 |
| 6,735,772 B1 | 5/2004 | MacPhail | 719/315 |
| 6,766,368 B1 * | 7/2004 | Jakobson et al. | 709/224 |
| 6,775,658 B1 * | 8/2004 | Zothner | 706/47 |
| 6,865,565 B2 * | 3/2005 | Rainsberger et al. | 706/47 |
| 6,883,000 B1 | 4/2005 | Gropper | 707/10 |
| 6,931,644 B2 | 8/2005 | Riosa et al. | 719/318 |
| 7,155,401 B1 * | 12/2006 | Cragun et al. | 705/10 |
| 7,376,618 B1 * | 5/2008 | Anderson et al. | 705/38 |
| 2002/0016867 A1 | 2/2002 | Kampe et al. | 709/318 |
| 2002/0038217 A1 | 3/2002 | Young | 705/1 |
| 2002/0133721 A1 * | 9/2002 | Adjaoute | 713/201 |
| 2003/0055759 A1 | 3/2003 | Conkwright et al. | 705/35 |
| 2003/0126181 A1 | 7/2003 | Young | 709/100 |
| 2003/0225883 A1 | 12/2003 | Greaves et al. | 709/224 |
| 2004/0230546 A1 * | 11/2004 | Rogers | 706/47 |

OTHER PUBLICATIONS

International Searching Authority, "Notification of Transmittal of the International Search Report and the Written Opinion of the International Searching Authority, or the Declaration," (PCT Rule 44.1), International Application No. PCT/US02/21271, mailed Nov. 27, 2002, 6 pages.

Nwana, Software Agents: An Overview, The Knowledge Engineering Review, Cambridge University Press, vol. 11, No. 3, Sep. 1996, pp. 205-244.

Bose et al., "Application of Intelligent Agent Technology for Managerial Data Analysis and Mining," ACM SIGMIS Database, vol. 30, No. 1, 1999, pp. 77-94.

Krishnamurthy, et al., Yeast: A General Purpose Event-Action System, *IEEE Transactions on Software Engineering*, vol. 21, No. 10, © 1995, Oct. 1995.

Waterman, *A Guide to Expert Systems*, 1986, pp. 249-252.

Samad, *Neural Networks for Control—An Overview*, 1991, pp. 1939-1946.

Stanley, *Neural Networks for Fault Diagnosis Based on Model Errors or Data Reconciliation*, Advances in Instrumentation and Control, Vo. 48, No. 3 (1993) pp. 1701-1709.

Uhrig, Use of Neural Networks in Necular Power Plants, *Proceedings of the 7th Power Plant Dynamics Control and Testing Symposium*, May 15-17, 1989, pp. 26.01-26.05.

W. H. Verduin, Optimizing Combustion with Integrated Neural Networks and AI Technologies, *Control Engineering*, Jul. 1992, pp. 38-40.

Yamaguchi, et al., Self-Organizing Control Using Fuzzy Neural Networks, *International Journal of Control*, vol. 56, No. 2, pp. 415-439, Aug. 1992.

Y. Yamamoto, *Integrated Approach Using Neural Network for Fault Detection and Diagnosis*, 1990 International Joint Conference on Neural Networks, pp. I-317 to I-326, 1990.

Sobajic, et al., *Robust Control of Non-Linear Systems Using Pattern Recognition*, 1989.

* cited by examiner

SYSTEM AND METHOD FOR ANALYZING BUSINESS EVENTS

CROSS-REFERENCE TO RELATED APPLICATIONS

This application claims priority to U.S. Provisional Application entitled "System and Method for Analyzing Business Events", Ser. No. 60/303,595, filed Jul. 5, 2001, which is hereby incorporated by reference in its entirety.

TECHNICAL FIELD

The present application generally relates to information and data management systems and methods. More particularly, the present application relates to business management systems and methods for managing and improving business processes and business performance.

BACKGROUND

There is presently a need to provide advanced solutions to the emerging eBusiness paradigm. In the eBusiness paradigm, sources and formats of information/services are of secondary importance compared to the need to leverage such information and services. The goal of eBusiness is to provide solutions that will increase business value to organizations. Increased business value is attained, for example, through leveraging existing IT investments in technology and infrastructure, leveraging business application investments, and maintaining and expanding existing business opportunities with existing and new clients through the intelligent utilization of business data generated by these relationships.

The eBusiness paradigm presents a challenge where the boundaries between the different components and technologies in a business environment have to be either eliminated or made to work together. Furthermore, while trying to succeed in this challenge, IT and business professionals also have to focus their resources on creating an opportunity to implement and execute the strategy that is most suited for their particular business organization.

Current business management systems are typically reactive in nature and utilize an enterprise application integration (EAI) environment, which provides the ability to commonly represent data and identify business events. However, with the increasing diversity of both the business environment and the technology that drives it, IT and business professionals need to feed business critical information to a common computing environment in order to effectively manage their business.

In addition, the present methods and systems for processing business data are not sufficient to enable businesses to take full advantage of the available business information. Specifically, there is not presently a method or system that identifies and generates business events utilizing the disparate available sources of potentially relevant business information. Further, the current methods and systems cannot adequately propagate identified business events to components that are interested in the identified business events. An additional shortcoming of current business methods and systems is the inability to analyze business events from a reactive, proactive and predictive perspective.

SUMMARY

The following presents a simplified summary of methods, systems, and computer readable media associated with identifying and generating business events. This summary is not an extensive overview and is not intended to identify key or critical elements of the methods, systems, and/or media or to delineate the scope of the methods, systems, and media. It conceptually identifies the methods, systems, and media in a simplified form as a prelude to the more detailed description that is presented later.

In accordance with one aspect of the present application, a system is disclosed for analyzing business events. The system includes a reactive event processing module, a proactive event processing module and a predictive event processing module.

The reactive event processing module is operative to receive a first business event and initiate a reactive process associated with the first business event. The proactive event processing module is operative to receive a second business event and initiate a proactive process associated with the second business event. The predictive event processing module is operative to receive a third business event and initiate a predictive process associated with the third business event; and The system further includes an event delivery module. The event delivery module is operative to deliver the business events to the reactive event processing module, the proactive event processing module and the predictive event processing module.

In accordance with other aspects of the present application, a method and an article of manufacture are also disclosed. The article of manufacture includes processing instructions for analyzing business events.

Certain illustrative aspects of the methods, systems, and computer readable media are described herein in connection with the following description and the annexed drawings. These aspects are indicative, however, of but a few of the various ways in which the principles of the methods, systems, and media may be employed and thus the examples are intended to include such aspects and equivalents. Other advantages and novel features may become apparent from the following detailed description when considered in conjunction with the drawings.

BRIEF DESCRIPTION OF THE DRAWINGS

For a more complete understanding of the present methods and systems, reference is now made to the following description taken in conjunction with the accompanying drawings in which like reference numbers indicate like features and wherein.

DETAILED DESCRIPTION

Figure 1:
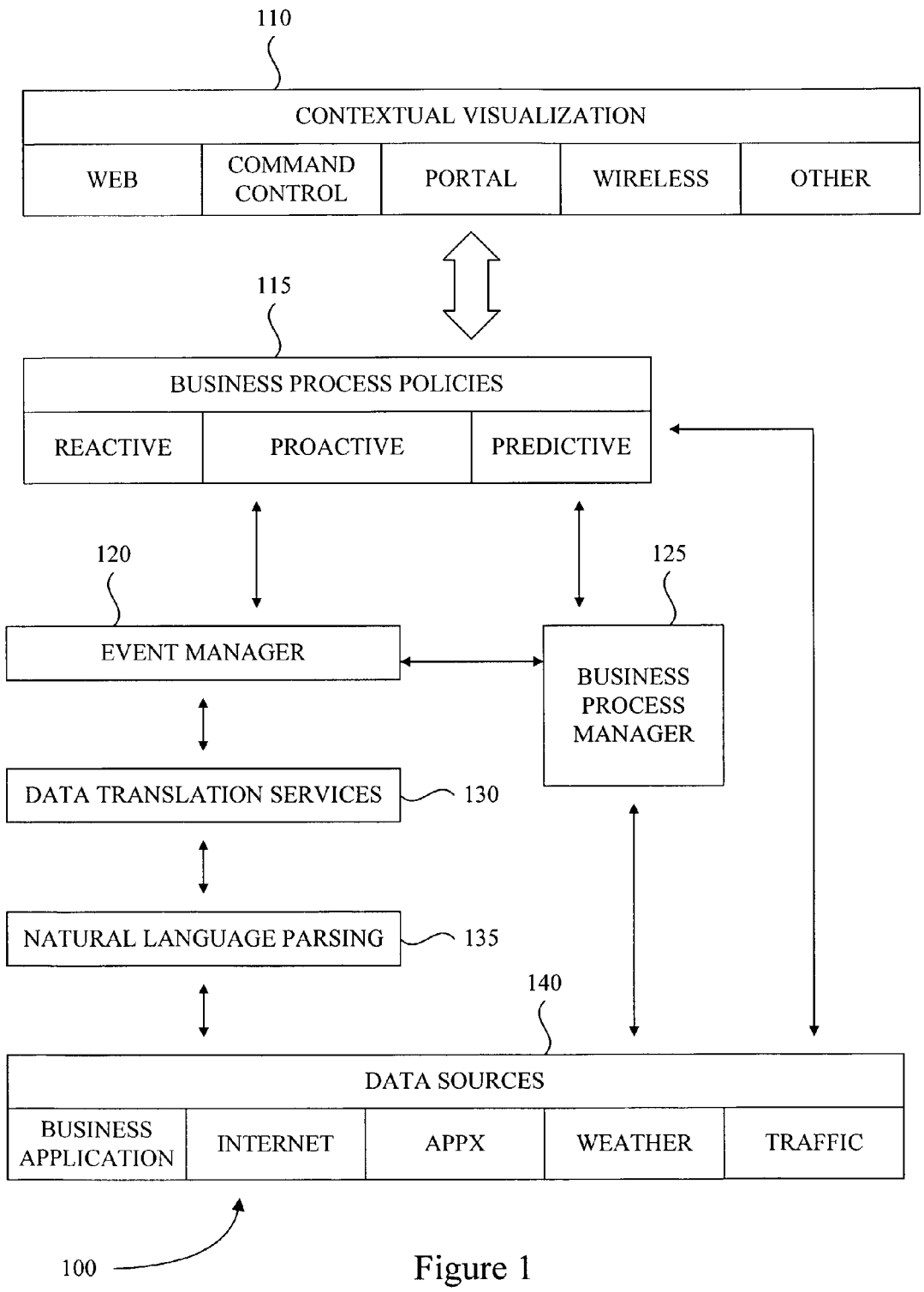
FIG. 1 is a schematic block diagram of an example business event processing environment that may employ example systems and/or methods for processing business events.

Example methods, systems, and computer readable media are now described with reference to the drawings, where like reference numerals are used to refer to like elements throughout. In the following description, for purposes of explanation, numerous specific details are set forth in order to facilitate thoroughly understanding the methods and systems. It may be evident, however, that the methods and systems can be practiced without these specific details. In other instances, well-known structures and devices are shown in block diagram form in order to simplify the description.

Business Event Processing Environment

Referring to FIG. 1, there is illustrated an example environment 100 in which business events may be processed. Generally, an event may be the identification of a significant happening in a computing environment as determined by business applications or human users. In other words, events may be generated automatically through software programs or manually through the intervention of a human. The event generation services described in this application provide a data and environment diagnostic service to accommodate multiple computing paradigms for information propagation.

Business event processing environment 100 includes a contextual visualization portion 110 that provides a graphical user interface ("GUI") for interacting with a human such as an end user or system administrator. The contextual visualization portion 110 may be embodied as a single simple interface, or it may be embodied as a collection of more complicated interfaces which may be integrated. For example, the contextual visualization portion 110 in the example environment 100 includes a web interface, a command and control console, a portal interface, a wireless interface to communicate with remote users, and it may be expanded to include other interfaces.

The contextual visualization portion 110 enables humans to receive information regarding identified business events and enables humans to provide feedback regarding business events, including defining a store of business process policies 115 that direct the manner in which business events are identified, propagated and analyzed.

In accordance with the present application, business process policies may be defined to employ reactive, proactive and predictive analytical frameworks to identify and respond to business events. Generally, reactive business process policies rely on correlation of data to identify and respond to business events. Proactive business process policies generally identify and respond to business events using inferences, and predictive business process policies typically involve the occurrence of compound events in identifying and responding to business events.

The business process policies within store 115 can be processed by both an event manager 120 and a business process manager 125. The event manager 120 identifyies business events in accordance with defined business process policies. In general terms, such identification is accomplished based on a review of information from various data sources 140. In some cases, querries into the data sources 140 and the data received in response, may be altered and/or interpreted by data translation services 130 and/or natural language parsing 135 in order to resolve any data formatting or interface differences between the event manager 120 and the individual data source. Typical data sources 140 may include, a business application, Internet data sources, and commercial or proprietary information sources providing weather and traffic data, for example.

Upon identifying an event based on the stored business process policies, event manager 120 generates a record of the event, such as an event object, for example, and notifies the business process manager 125 of the event. Business process manager 125 utilizes the defined business process policies to process a response to the identified business event. As illustrated, in some cases, while processing a response to a business event, business process manager 125 may request additional data from one or more data sources 140.

Business Event Identification

Figure 2:
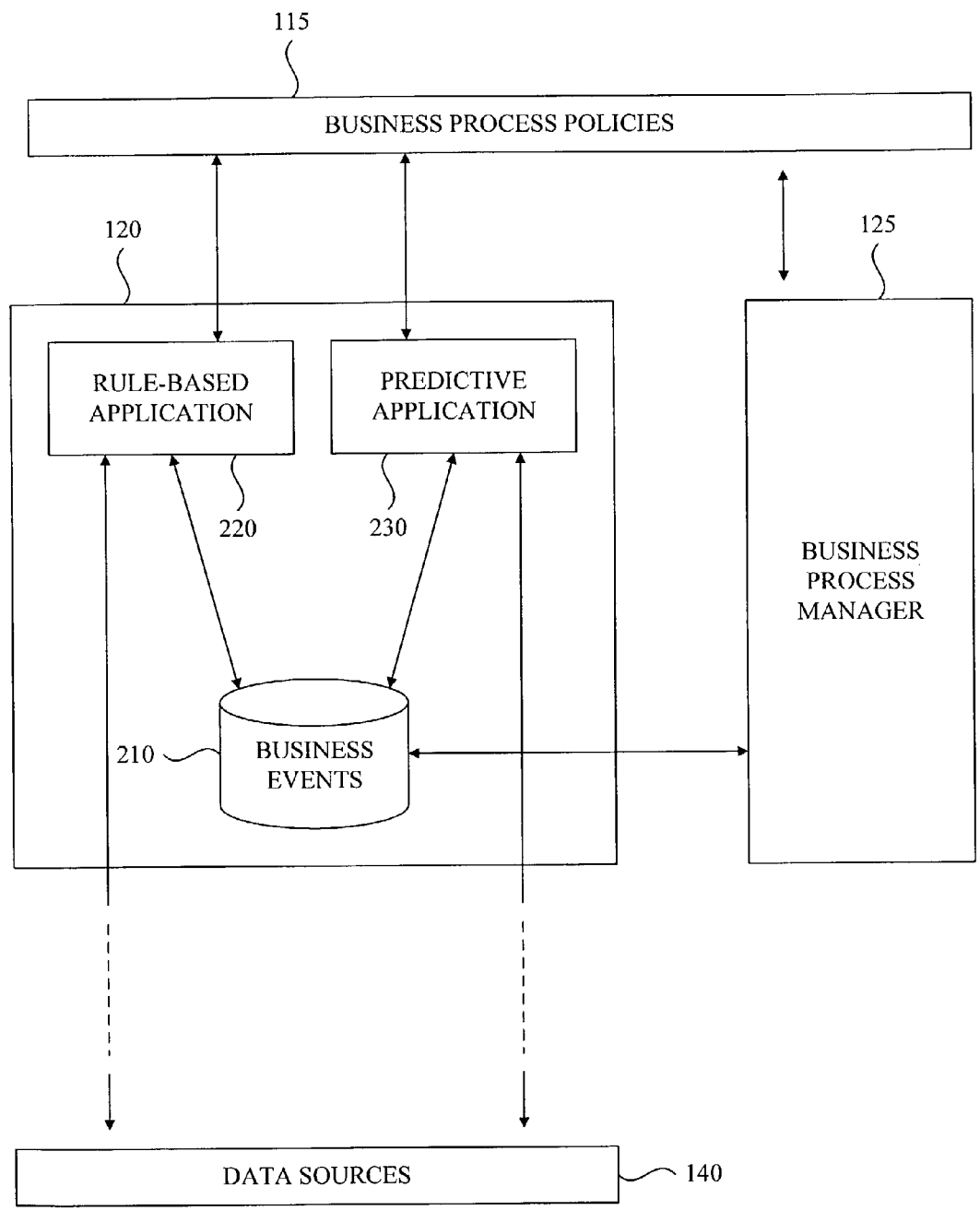
FIG. 2 is a schematic block diagram of a portion of the example business event processing environment of FIG. 1 that identifies business events.

Referring now to FIG. 2, there is provided a more detailed view of an exemplary embodiment of the event manager 120. As shown, event manager 120 includes a store of business events 210, a rule-based application 220 and a predictive application 230. Rule-based application 220 and predictive application 230 reference the store of business process policies 115 and certain data sources 140 to identify business events. Once identified, a record of a business event, embodied as a business event object, for example, is added to the store of business events 210.

The illustrated configuration of event manager 120 enables events to be identified in many different ways. For example, events may be identified according to:

Subscription to singular events;
Singular events identified by event listeners; and
Compound or intelligent events.

Rule-based application 220 may employ an information provider, such as the Advantage™ Integration Server (formerly known as Jasmine$_{ii}$) information provider offered by Computer Associates International, Inc., to enable subscription to singular events. The events are "thrown" or "published" by the information providers as objects in an object-based computing architecture that represent the occurrence of an event. Typically, the information contained within an event object will include particular data related to the occurrence. The nature of the information providers and the nature of the events can vary widely depending on the type of information associated with these sources.

Rule-based application 220 may also employ event listening applications, such as certain components built within an organization's business process management solution, such as the BizWorks e-business process management solution offered by Computer Associates International, Inc., to identify business events by detecting activity associated with a particular business object such as, for example, an account balance, bill of materials or purchase order. The information providers do not need to "throw" an event in order for an event listener to detect the event. Instead, an information provider simply performs a requested action such as, for example, "update account balance" or "generate bill of materials" and the environment services broker the information to components such as the event listener.

Predictive application 230 can utilize various intelligent technologies capable of predicting events either alone or in combination with other solutions to enable identification of compound events. Examples of such intelligent technologies include clustering, neural networks and other pattern recognition technologies. Predictive business process policies can also identify a business event not necessarily from the occurrence of a single event but, for example, as an aggregation of multiple events that are analyzed and compounded to create other events. For example, a specific event such as "demand for product ABC is likely to increase in the next 30 days" is an event that is a derivation of the occurrence and analysis of previous, discrete events. Similarly, more abstract events such as "Company X in financial trouble" is also an event type supported by this application that leverages the accumulation of both discrete events and application of business policies regarding the definition of what "financial trouble" represents to a particular business. Combining predictive technology with rules-based technology creates intelligent knowledge-based applications that can then become sources for intelligent business events.

An example of neural network technology that may be employed is described by commonly assigned U.S. Pat. No. 6,327,550 entitled "Method and Apparatus for System State Monitoring Using Pattern Recognition and Neural Networks", issued Dec. 4, 2001, which is incorporated herein in its entirety by reference.

Knowledge of the type of events that can be identified complement and increase the power benefits of this solution. For example, information providers such as business applications, ERP applications, or other typical participants in an EAI-like environment are further complemented by the incorporation of other out-of-band information sources that represent structured and unstructured data. Structured data is data available from information sources in a pre-defined or pre-formatted fashion. This makes it easier and more predictable for parsing purposes. Unstructured data poses a greater challenge, but also provides a greater benefit to the business process policies since it may represent information such as news or other textual information for which advanced technology, such as natural-language-parsing ("NLP") is suitable.

For example, information such as "according to a news source ACME has just filed for bankruptcy" can be turned into intelligent events that may trigger event management services of any nature (reactive, proactive or predictive) to apply business policies defined to deal with this type of information. Some examples of appropriate business process policies include identifying all outstanding orders by ACME, putting a hold on them, notifying the sales manager, and escalating to the CFO.

Figure 3:
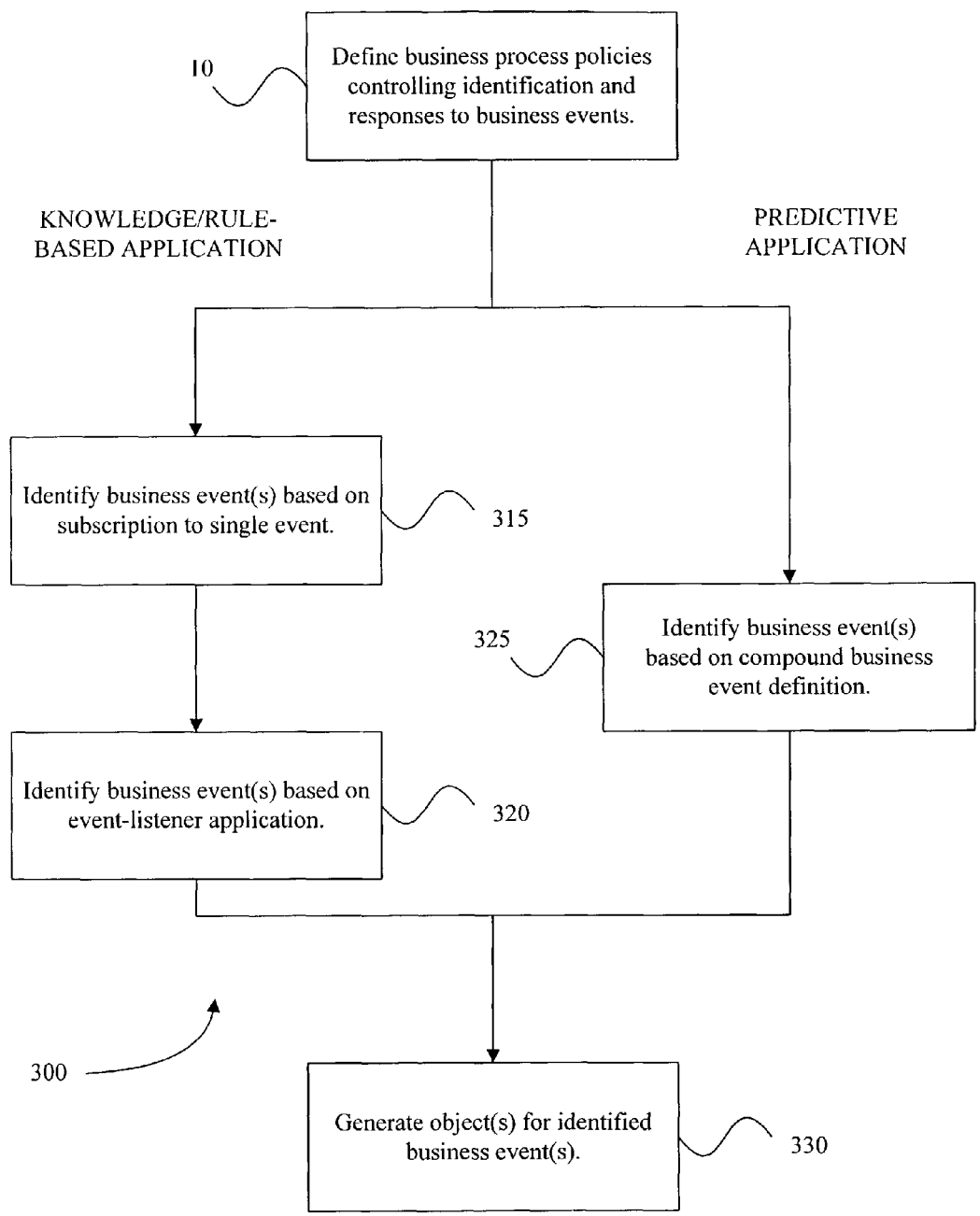
FIG. 3 is a flow chart that illustrate an example methodology for identifying business events and generating business notifications.

FIG. 3 illustrates one example methodology 300 that may be employed to identify business events in accordance with the present application. At block 310 business process policies are defined to control identification of and responses to business events. The defined business process policies are implemented using a rule-based application and/or a predictive application.

The rule-based application processes block 315 to identify one or more business event based on a subscription to a single event. The rule-based application also processes block 320 to identify one or more business events employing an event-listener application.

The predictive application identifies one or more business event based on business process policies employing a compound business event definition as illustrated at block 325. Once the rule-based application or predictive application identifies a business event, the event manager generates a record of the event, such as a business event object, as shown at block 330.

The example system and method illustrate certain aspects of the present application, namely:
1. Using knowledge-based or rules-based applications that implement business process policies.
2. Using predictive applications that implement business process policies.
3. Using a combination of rules-based and predictive applications.

These combinations of technologies provide a way to detect situations and patterns using inference, correlation, and pattern prediction technology, as needed, to create new business events that need analysis and management. The data that these methods operate on can come from information management platform, such as the Advantage Integration Server information management platform. The data can also be the result of a continuous circle of executing business policies, workflow engines, or the data can be downloaded from relevant business information sources including, for example, global computer networks, such as Internet, B2B, B2C, WAN, LAN, batch, or human operator.

There are additional data sources that may be relied upon to identify (or detect) business events. For example, a user could employ out-of-band or discrete and seemingly unrelated information that may be structured or non-structured. Examples of such sources include weather, traffic and/or news sources. Data from such sources can be processed and analyzed using natural-language-parsing services 135, or the data can be processed through transformation methodologies capable of probing for or requesting additional information. Examples of information requests include: 'What is the current temperature in Moscow, Russia?' or 'Are there any major traffic alerts along the southeastern US?' or 'Are any of our clients likely to file for bankruptcy?'

Upon identification, event generation services would be used to propagate the information appropriately, in whatever format is needed. Data translation could be provided by data transformation and translation service 130.

Business Event Generation

Figure 4:
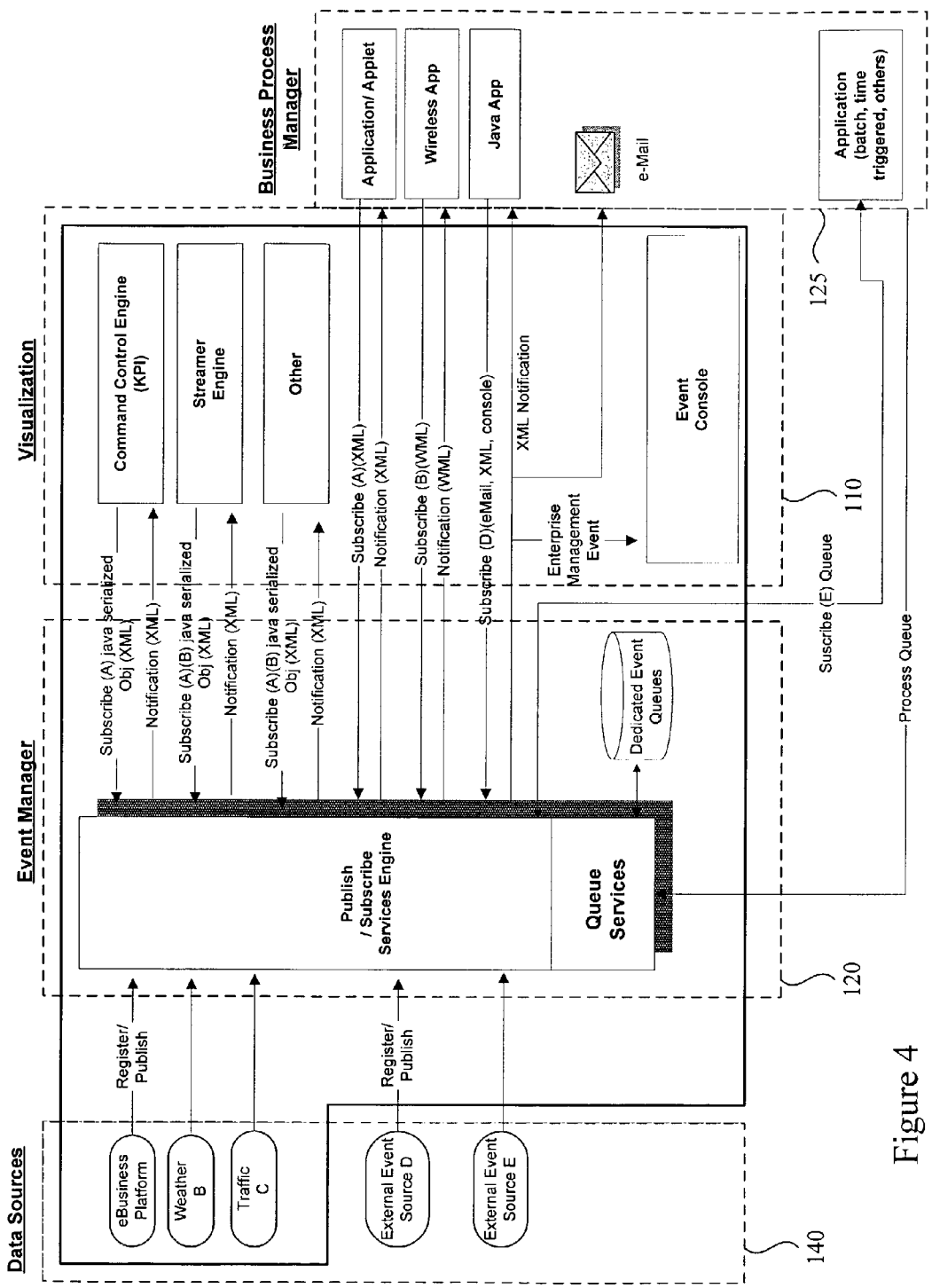
FIG. 4 is a schematic block diagram of a portion of the example business event processing environment of FIG. 1 that propagates business event notifications to interested components.

Referring now to FIG. 4, there is illustrated a more detailed view of contextual visualization portion 110, event manager 120, and business process manager 125. Further illustrated are exemplary data, formats, and communication protocols which may be employed among components within the business processing environment 100. FIG. 4 illustrates the architecture of the event generation and notification services, an exemplary event publishing and subscription infrastructure, as well as a Java-based servlet that provides CLI and API interfaces. The event generation services can be invoked as a URL, a software program library (using, for example, Java), a triggered or scheduled response to another event (using, for example, a CLI), or as a pre-defined rules-based and/or neural-based library or other predictive technology.

The architecture augments an integrated data analysis and management system by providing an event services that employ a "publish and subscribe" information-sharing paradigm. Under this paradigm, the system provides the ability for an integrated or developed application, component, client, or any other form of software application using the system services to register themselves as event sources. Similarly, any client application, component or client can register or subscribe as clients or as interested on certain events emanating from event sources. This subscription capability is realized through the definition of data channels that may represent particular types of events and may also include many different Event Sources.

As previously mentioned with reference to FIGS. 2 and 3, business events can be created through different methods both within and outside the common environment. Business events can be created through applications built using publish and subscribe services from the common environment to provide notification on any object transactions such as delete, modify, or add an object or class. These objects can represent any type of business and/or non-business data including, for example, data relating to supply chains, financials, banking, weather, traffic, bankruptcy, mergers and/or acquisitions, or any other type of information that can be represented as an object as defined by common software terms dealing with object-based computer architectures and environments.

Business events can also be created through an application utilizing the CLI and API-based services for message generation that are part of the event management services. The message generation and delivery services provide a robust, guaranteed delivery infrastructure.

Further, business events can be created through the execution and application of business process policies, as previously defined, that in turn may consume other business events and related information in order to determine the need for generation of an event. This provides a full operating circle where hierarchies of related events can be generated and managed, as appropriate.

The propagation and generation of events is accomplished using a web-based paradigm that supports different types of data formats representing the event. These types include:

Objects representing the event created in an object-based computing architecture and environment. Class, property, and object specification can be customized to suit a particular purpose.

Text-based, formatted messages using pre-defined and definable XML schema to be delivered to the event management services.

Text- or object-based representing triggers for workflow engines involved in the business process management. Triggers can assume any form including formatted text messages, XML and objects.

Any other form of data to suit the particular needs of the business process policy that may deal with the event.

One benefit of using a web-based approach for the propagation and generation of events is that it enables a single, non-proprietary protocol and platform support. Another benefit is the ability to span LAN, WAN, or global networks, such as the Internet, in a common, supported platform while adhering to standard security approaches including proxies and firewalls.

As shown in FIG. 4, the services may be based on a publish/subscribe paradigm and support event queuing services. The architecture includes predefined event sources, and, for example, through the use of an XML API, can be extended to support other internal, as well as external, event sources. Any application or program can register with the notification services (publish/subscribe) engine via the API. After registering with the system, the application can publish events into the common environment where they become available to any event subscriber. An integrated notification services engine of the publish/subscribe engine manages the events received. The events are placed on one or more persistent queues. One or more notification dispatchers process the events and deliver them to the subscribers as necessary. The notification services engine may also include queuing services. The queuing services provide support for post-generation processing of events on a point-to-point basis. For example, an application that runs at specific intervals can wake up and process a dedicated queue containing all the events for which it subscribed.

Event subscribers can query the system for available event sources and can subscribe to any number of them. When subscribing to events, the subscriber specifies information such as the format in which they want to receive the event, the delivery method, whether there is a need to create a dedicated queue, etc. For example, an application can subscribe to weather events and request that the message be delivered as XML posted to the event console. It could also request that the same notification take the form of a Java serialized object delivered through an API callback. The available event formats and delivery methods can be specified when configuring the system. The system supports plug-in notification/delivery modules and thus provides a way to extend the default capabilities of the system.

The event listener publisher is one of the data sources 140 delivered with the system. The event listener publisher exposes, for example Advantage Integration Server events to the common environment so that they can be delivered to any subscriber. The publisher can be configured via GUI, CLI and API. Preferably, this configuration is always persistent. It can also be configured to generate additional events on-demand by any application during subscription (XML). By default, on-demand configuration of the Event Listener Publisher is transient. That is, the additional requested events are only valid while the system is up.

The event listener publisher can expose any events proceeding from within $Jasmine_{11}$. This includes class, object and property events as generated by the connected data sources. As a data source 140, the event listener publisher, through the notification services, can deliver $Jasmine_{11}$ notifications to any application subscribed to it.

Figure 5:
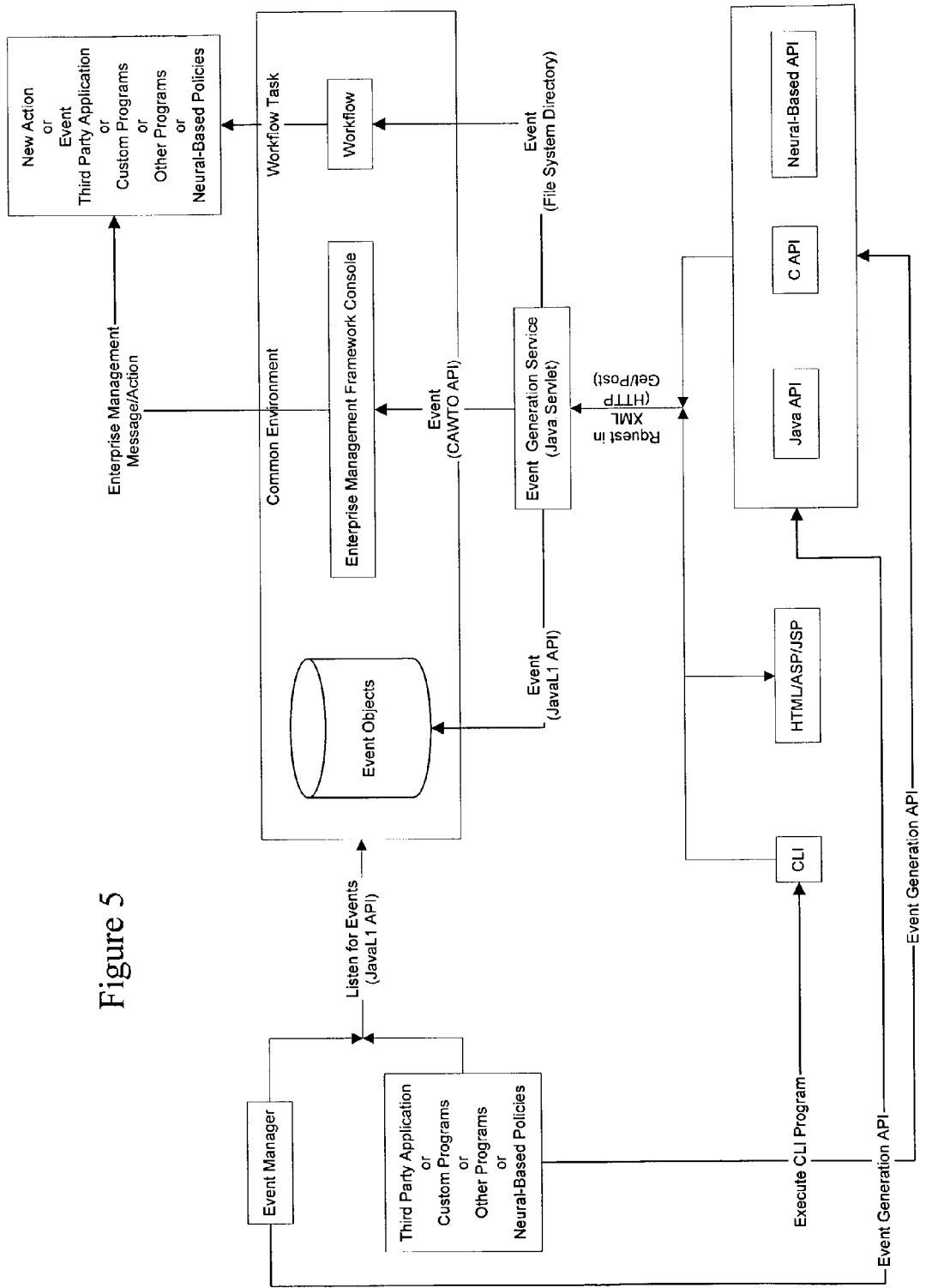
FIG. 5 is a diagram illustrating the flow of event data between various components of the example business event processing environment.

Referring now to FIG. 5, there is illustrated the data flow of events being generated from various sources. Events are generated using the event generation API. The API consists of various libraries supporting a variety of languages. Examples of the supported languages which may be included are Java, C, and Aion, a proprietary language offered by Computer Associates International, Inc. There is also a CLI interface, which allows for a solution without the need to write any additional code. In one embodiment, the services are implemented using servlets. It is also possible to use get and post requests from HTTP, ASP, or JSP pages to generate an event. All events should be generated in the common environment.

When a request to generate an event is submitted either by CLI or through an API call, the request is sent to the event generation servlet using an XML message format. The event generation servlet receives the request and generates the appropriate event within the common environment.

According to the example architecture, the interaction between the various event generation methods is through HTTP Get or Post requests. The event data is sent to the event generation service in XML. The event generation service validates the event, generates the event in XML format in the common environment and sends a response back in XML format. The API's and CLI's interpret the result from the response XML. If using web access methods, then the result is returned in XML. It is up to the program or page to determine if the operation was successful or not.

Event generation is handled by the event generation service. The service may be implemented as a Java servlet. When a request to generate an event is received, the event generation service creates an event object and/or create a Unicenter TNG or other enterprise management message.

Business Event Propagation

Once the event is generated in the common environment, the event is available to any program or process, which subscribed to the event or the to the general class of events that the particular event belongs to. During event subscription, a subscriber can specify how the event should be propagated to it. That is, the subscriber requests a supported delivery method. For instance, an application can subscribe to data source 'A' and request that events be delivered to it via an HTTP connection, email, a wireless message, API callback or other method. The example architecture includes support for a wide set of delivery methods. These include TNG messages, HTTP connection, Java interfaces, email, wireless, etc. The system is extensible by using Java interfaces that describe the requirements for an event delivery module. Any program implementing the interface can provide additional methods of delivery.

Business Event Analysis

The present application provides information and data management systems and methods that are capable of operating in any combination of reactive, proactive and predictive paradigms. The architecture of the present system enables these paradigms to be deployed in association with existing EAI environments. These different paradigms (reactive, proactive, predictive) represent the different capabilities provided by the system components, including event management services for generating multi-form messages into central repositories of information.

A reactive paradigm represents a management approach where events are dealt with as exceptions and upon occurrence. That is, the event is identified before an appropriate business process policy is applied.

A proactive paradigm represents an approach where an intelligent integrated or stand-alone application (usually knowledge-based or rules-based applications) may consume and process (correlate and/or infer) information to determine a course of action that may include the generation of events or the enforcement of previously defined policies such as, for example, a workflow, a notification or a record update.

A predictive paradigm represents an approach where an intelligent integrated or stand-alone application may consume and process information (analyzing patterns and relationships) that may conclude in the generation of events or predictions regarding possible events or situations that may arise. In a similar fashion, as the proactive paradigm, this event generation may trigger the application of any business process intended to deal with the business event.

In addition, the systems and methods according to the present application provide the ability to extend pure EAI environments or pure event management environments into a single seamless computing environment where all related and necessary components needed to deal with a particular business event are orchestrated together in such a way that no individual component needs to be aware of more information than necessary within its own native capabilities.

Further the present application provides an intelligent management methodology for responding to existing and future events. For example, in the business context, the intelligent management methodology for business events would be any combination of reactive, proactive, and predictive business process policies using inference, correlation, and rule-based and predictive technologies. This methodology also provides for the business process policies to reach out and gather more information, as appropriate, that is fed to a common computing environment by information providers via wrappers, business policies, workflow engines, and business events.

Figure 6:
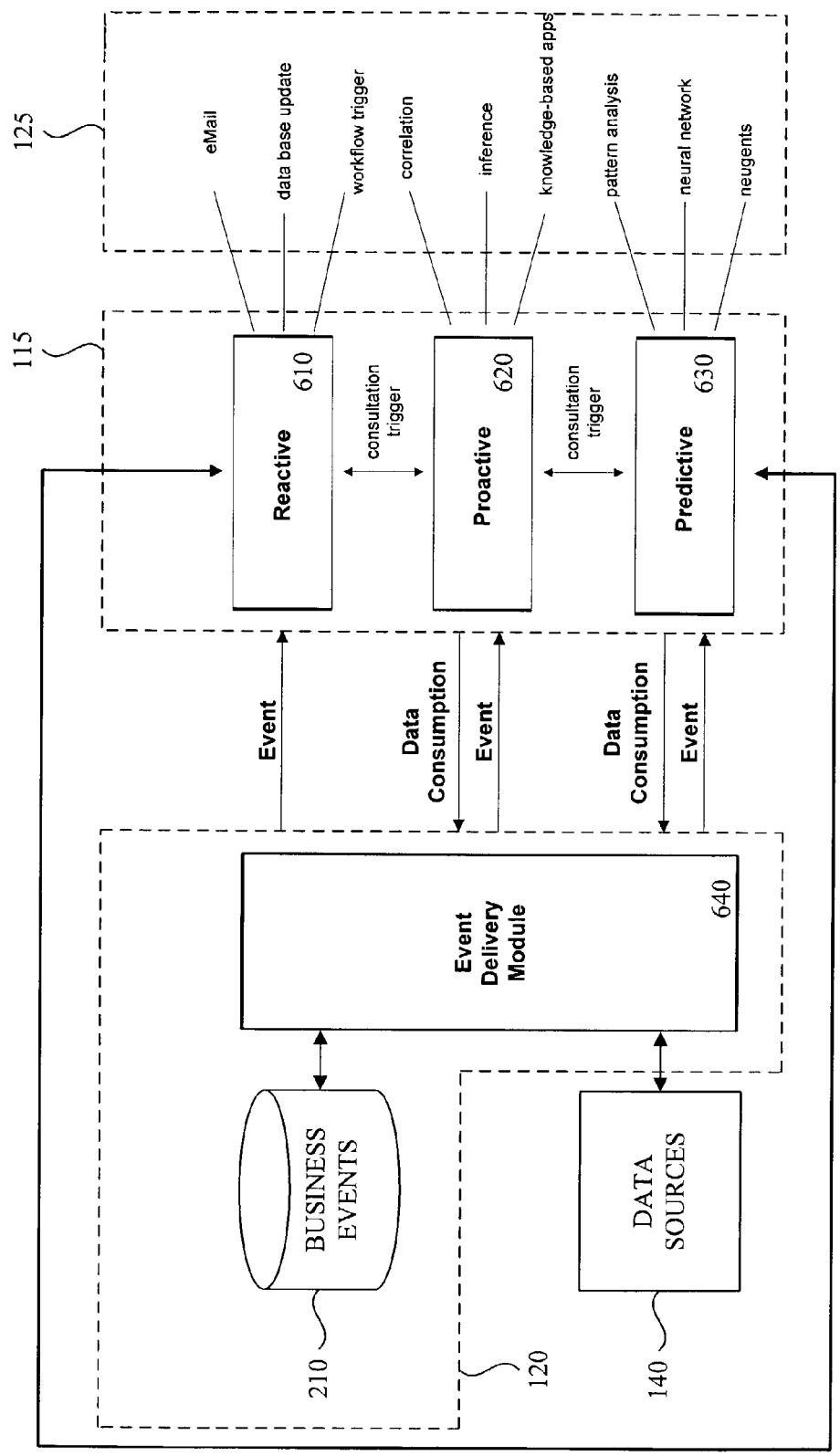
FIG. 6 is a schematic block diagram of a portion of the example business event processing environment of FIG. 1 that integrates three analytical paradigms to analyze business events.

Referring now to FIG. 6, a schematic block diagram is presented depicting the operation of reactive, proactive and predictive business process policies within the business processing environment 100. As shown, the exemplary system includes reactive, proactive and predictive business process policies maintained within store 115. Each type of business process policy is operative to initiate a response process associated with a business event.

Each of the different types of business process policies 610, 620 and 630 receive notification of a relevant event from event delivery module 640. In some cases, such as with the illustrated proactive 620 and predictive 630 business process policies, additional information may be requested in order to process a response.

In reactive management paradigm, an event acts as a trigger for some management action that may need to be engaged. This management action can in turn be any type of finite or infinite sequence of steps. Accordingly, upon receiving an event notification from event delivery module 640, reactive business process policy 610 may respond, for example, by sending an e-mail message, updating a database or triggering a workflow process.

In a proactive management paradigm, an intelligent entity such as, but not limited to, a business process policy, is continually consuming information and applying analysis methods without depending on the occurrence of a trigger event. If and when necessary, a proactive entity may engage the reactive or predictive paradigms to either trigger a sequence of actions (reactive) or perhaps consult and leverage additional analysis capabilities (predictive). Note that proactive entities may also be triggered and set off by the occurrence of an event. Upon receiving a triggering event notification from event delivery module 640, proactive business process policy 620 may respond, for example, by correlating data, drawing an inference or triggering a knowledge-based application.

A predictive paradigm is one where entity of more advanced intelligence than the proactive or reactive types is also consuming information or events. Similarly to the proactive paradigm, if and when necessary, the predictive paradigm may engage the reactive or proactive counterparts which will then have leveraged higher intelligence in order to perform their functions. Predictive business process policy 630 may from time to time employ pattern analysis, employ neural network or neural agents while processing business events.

As shown, any type of business process policy may generate a consultation trigger for another business process policy when processing and/or analyzing business events.

The system of FIG. 6 enables a management methodology that aggregates three different, and individually powerful, management paradigms. These reactive, proactive, and predictive paradigms are not mutually exclusive and can leverage power from each other to provide a capability that is not presently known. Accordingly, the present application provides any level of event management power necessary to deal with information.

For example, reactive management may be used as the initial trigger to a proactive or predictive process based on the occurrence of a single business event. Alternately, a proactive or predictive process may trigger a reactive process by generating a single business event which is the result of complex correlations and pattern analysis processes to arrive to a finite set of events that must be managed.

In this methodology, the collaboration and communication process is flexible to accommodate any type of management capability needed by a particular event or generated information that triggers the management services.

FIG. 6 illustrates that the three paradigms are engaged and integrated to collaborate. A business event can reach the management layer represented by the paradigm integration in different ways, as shown. For example, events can be derived from any data, event, services, or information sources.

Once an event is delivered, it may trigger any collaboration sequence (or multiple independent sequences) as defined by certain business process embodied in the individual or aggregated paradigms. That is, business process policies may, simultaneously or sequentially, trigger reactive, proactive, or predictive management process or any combination, of any length, between the three.

For example, detection and prevention of bank transaction fraud could be implemented as a collaboration of the three paradigms. An event representing a check deposit may be detected and forwarded to the reactive layer. The reactive layer may then communicate with the proactive components that in turn will consume additional information to determine whether this transaction may be a fraud risk. Different paradigms such as knowledge-based or rule-based approach may be used to apply heuristics to identify transaction patterns. If indeed, the proactive component is able to determine a pattern of fraud, it may return to the reactive layer in the form of a fraud alert event. However, if the proactive layer does not identify a fraud pattern, it may consult the predictive layer, which may in turn indeed find a fraud pattern that was not discernible to the proactive layer.

It should be noted that this embodiment of collaboration is just one example of how the paradigms may collaborate. A different management approach to the same event (check deposit) may choose to engage the three paradigms at the same time or allow the proactive or predictive paradigms to be continually consuming and revisiting deposit information through the day instead of on just every occurrence.

What has been described above includes several examples. It is, of course, not possible to describe every conceivable combination of components or methodologies for purposes of describing the systems, methods, and computer readable media associated with business process policy data. However, one of ordinary skill in the art may recognize that further combinations and permutations are possible. Accordingly, this application is intended to embrace such alterations, modifications, and variations that fall within the scope of the appended claims. Furthermore, to the extent that the term "includes" is employed in the detailed description or the claims, such term is intended to be inclusive in a manner similar to the term "comprising" as that term is interpreted when employed as a transitional word in a claim.

What is claimed is:

1. A computer system for analyzing business events, comprising a non-transitory computer-readable storage medium, the non-transitory computer-readable medium having:
    a business process policy module operable to store one or more business process policies for use in identifying, propagating, and analyzing one or more business events, the one or more business process policies comprising:
        a reactive business process policy;
        a proactive business process policy; and
        a predictive business process policy;
    an event manager comprising:
        a rule-based application and a predictive application operable to access and implement the one or more business process policies stored in the business process policy module, the event manager operable to identify a business event in accordance with the one or more business process policies; and
    an event delivery module operable to:
        determine one or more of the business process policies to which the business event should be forwarded; and
        communicate the business event to the one or more determined business process policies;
    wherein:
        the reactive business process policy is operable to receive, if it is determined that the business event should be forwarded to the reactive business process policy, the business event from the event delivery module and initiate a reactive process associated with the business event;
        the proactive business process policy is operable to receive, if it is determined that the business event should be forwarded to the proactive business process policy, the business event from the event delivery module and initiate a proactive process associated with the business event;
        the predictive business process policy is operable to receive, if it is determined that the business event should be forwarded to the particular predictive event processing module, the business event from the event delivery module and initiate a predictive process associated with the business event; and
        the proactive business process policy is operable to generate a consultation trigger based on the business event for transmission to the reactive business process policy.

2. The system of claim 1, wherein the reactive business process policy is operable to initiate an e-mail message related to the business event.

3. The system of claim 1, wherein the reactive business process policy is operable to direct a database to be updated based on the business event.

4. The system of claim 1, wherein the reactive business process policy is operable to generate a workflow trigger based on the business event.

5. The system of claim 1, wherein the reactive business process policy is operable to generate a consultation trigger based on the business event for transmission to the proactive business process policy.

6. The system of claim 1, wherein the reactive business process policy is operable to generate a consultation trigger based on the business event for transmission to the predictive business process policy.

7. The system of claim 1, wherein the reactive business process policy is operable to receive and process a consultation trigger from one or more of the proactive business process policy and the predictive business process policy.

8. The system of claim 1, wherein the proactive business process policy is operable to correlate business data based on the business event.

9. The system of claim 1, wherein the proactive business process policy is operable to draw an inference based on the business event.

10. The system of claim 1, wherein the proactive business process policy is operable to communicate with a knowledge-based application.

11. The system of claim 1, wherein the proactive business process policy is operable to generate a consultation trigger based on the business event for transmission to the predictive business process policy.

12. The system of claim 1, wherein the proactive business process policy is operable to receive and process a consultation trigger from one or more of the reactive business process policy and the predictive business process policy.

13. The system of claim 1, wherein the predictive business process policy is operable to analyze patterns.

14. The system of claim 1, wherein the predictive business process policy is operable to use a neural network to process the particular business event.

15. The system of claim 1, wherein the predictive business process policy is operable to use a neural agent to process the business event.

16. The system of claim 1, wherein the predictive business process policy is operable to generate a consultation trigger based on the business event for transmission to the reactive business process policy.

17. The system of claim 1, wherein the predictive business process policy is operable to generate a consultation trigger based on the business event for transmission to the proactive business process policy.

18. The system of claim 1, wherein the predictive business process policy is operable to receive and process a consultation trigger from one or more of the reactive business process policy and the proactive business process policy.

19. A method for analyzing business events, comprising:
identifying, by a computer, one or more business events using an event manager comprising a rule-based application and a predictive application that are operable to access and implement one or more business process policies stored in a business process policy module, the one or more business process policies stored in the business process policy module comprising a reactive business process policy, a proactive business process policy, and a predictive process policy, the one or more business process policies for use in identifying, propagating, and analyzing the one or more business events;
determining one or more of the business process policies to which a particular business event should be forwarded;
initiating, if it is determined that the particular business event should be forwarded to the reactive business process policy, a reactive process to process the particular business event;
initiating, if it is determined that the particular business event should be forwarded to the proactive business process policy, a proactive process to process the particular business event;
initiating, if it is determined that the particular business event should be forwarded to the predictive business process policy, a predictive process to process the particular business event; and
generating, from the proactive business process policy, a consultation trigger based on the particular business event for transmission to the reactive business process policy.

20. The method of claim 19, wherein the reactive process comprises initiating an e-mail message related to the particular business event.

21. The method of claim 19, wherein the reactive process comprises directing a database to be updated based on the particular business event.

22. The method of claim 19, wherein the reactive process comprises generating a workflow trigger based on the particular business event.

23. The method of claim 19, wherein the reactive process comprises generating a consultation trigger based on the particular business event for transmission to the proactive business process policy.

24. The method of claim 19, wherein the reactive process comprises generating a consultation trigger based on the particular business event for transmission to the predictive business process policy.

25. The method of claim 19, wherein the reactive process receives and processes a consultation trigger from one or more of the proactive business process policy and the predictive business process policy.

26. The method of claim 19, wherein the proactive process comprises correlating business data based on the particular business event.

27. The method of claim 19, wherein the proactive process comprises drawing an inference based on the particular business event.

28. The method of claim 19, wherein the proactive process comprises communicating with a knowledge-based application.

29. The method of claim 19, wherein the proactive process comprises generating a consultation trigger based on the particular business event for transmission to the predictive business process policy.

30. The method of claim 19, wherein the proactive process receives and processes a consultation trigger from one or more of the reactive business process policy and the predictive business process policy.

31. The method of claim 19, wherein the predictive process comprises analyzing patterns.

32. The method of claim 19, wherein the predictive process comprises using a neural network to process the particular business event.

33. The method of claim 19, wherein the predictive process comprises using a neural agent to process the particular business event.

34. The method of claim 19, wherein the predictive process comprises generating a consultation trigger based on the particular business event for transmission to the reactive business process policy.

35. The method of claim 19, wherein the predictive process comprises generating a consultation trigger based on the particular business event for transmission to the proactive business process policy.

36. The method of claim 19, wherein the predictive process receives and processes a consultation trigger from one or more of the reactive business process policy and the proactive business process policy.

37. A non-transitory computer-readable storage medium comprising software for analyzing business events, the software when executed operable to:
identify one or more business events using an event manager comprising a rule-based application and a predictive application that are operable to access and implement one or more business process policies stored in a business process policy module, the one or more business process policies stored in the business process policy module comprising one or more reactive business process policies, one or more proactive business process policies, and one or more predictive process policies, the one or more business process policies for use in identifying, propagating, and analyzing the one or more business events;
determine one or more of the business process policies to which a particular business event should be forwarded;
initiate, if it is determined that the particular business event should be forwarded to the reactive business process policy, a reactive process to process the particular business event;
initiate, if it is determined that the particular business event should be forwarded to the proactive business process policy, a proactive process to process the particular business event;
initiate, if it is determined that the particular business event should be forwarded to the predictive business process policy, a predictive process to process the particular business event and
generate, from the proactive business process policy, a consultation trigger based on the particular business event for transmission to the reactive business process policy.

* * * * *